(12) United States Patent
Forkner et al.

(10) Patent No.: US 9,988,483 B2
(45) Date of Patent: Jun. 5, 2018

(54) PYRROLIDINE-BASED CATALYSTS FOR USE IN POLYURETHANE MATERIALS

(71) Applicant: Huntsman Petrochemical LLC, The Woodlands, TX (US)

(72) Inventors: Matthew W. Forkner, Conroe, TX (US); Robert A. Grigsby, Jr., Spring, TX (US); Eugene P. Wiltz, Jr., The Woodlands, TX (US); Ernest L. Rister, Jr., Round Rock, TX (US); Frank Rodriguez, Conroe, TX (US); Howard P. Klein, Austin, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 0 days. days.

(21) Appl. No.: 15/126,367

(22) PCT Filed: Jun. 24, 2015

(86) PCT No.: PCT/US2015/037304
§ 371 (c)(1),
(2) Date: Sep. 15, 2016

(87) PCT Pub. No.: WO2015/200408
PCT Pub. Date: Dec. 30, 2015

(65) Prior Publication Data
US 2017/0101501 A1    Apr. 13, 2017

Related U.S. Application Data

(60) Provisional application No. 62/018,261, filed on Jun. 27, 2014.

(51) Int. Cl.
| | |
|---|---|
| C08G 18/20 | (2006.01) |
| C08G 18/08 | (2006.01) |
| C08G 18/32 | (2006.01) |
| C08G 18/76 | (2006.01) |
| C08G 18/66 | (2006.01) |
| C08J 9/14 | (2006.01) |
| C08J 9/12 | (2006.01) |
| C08J 9/00 | (2006.01) |
| C08G 101/00 | (2006.01) |

(52) U.S. Cl.
CPC ......... *C08G 18/2081* (2013.01); *C08G 18/14* (2013.01); *C08G 18/3206* (2013.01); *C08G 18/3218* (2013.01); *C08G 18/664* (2013.01); *C08G 18/7664* (2013.01); *C08J 9/00* (2013.01); *C08J 9/125* (2013.01); *C08J 9/127* (2013.01); *C08J 9/144* (2013.01); *C08G 2101/0008* (2013.01); *C08G 2101/0083* (2013.01); *C08J 2203/10* (2013.01); *C08J 2203/142* (2013.01); *C08J 2203/162* (2013.01); *C08J 2203/182* (2013.01); *C08J 2205/05* (2013.01); *C08J 2205/06* (2013.01); *C08J 2375/04* (2013.01); *C08J 2375/06* (2013.01)

(58) Field of Classification Search
CPC .......................... C08G 18/14; C08G 18/2081; C08G 18/3206; C08G 18/3218; C08G 18/664; C08G 18/7664; C08G 2101/0008; C08G 2101/0083; C08J 9/00; C08J 9/125; C08J 9/127; C08J 9/144; C08J 2203/10; C08J 2203/142; C08J 2203/162; C08J 2203/182; C08J 2205/05; C08J 2205/06; C08J 2375/04; C08J 2375/06
See application file for complete search history.

(56) References Cited

U.S. PATENT DOCUMENTS

| | | |
|---|---|---|
| 3,963,680 A | 6/1976 | O'Keefe et al. |
| 4,379,861 A | 4/1983 | Haas et al. |
| 4,450,246 A | 5/1984 | Jachimowicz |
| 5,134,217 A | 7/1992 | Weider et al. |
| 5,274,114 A | 12/1993 | Weider et al. |
| 5,420,170 A | 5/1995 | Lutter et al. |
| 5,648,447 A | 7/1997 | Seneker et al. |
| 5,756,557 A | 5/1998 | Kimock et al. |
| 6,107,359 A | 8/2000 | Dietrich et al. |
| 6,552,100 B2 | 4/2003 | McLaren et al. |

(Continued)

FOREIGN PATENT DOCUMENTS

| | | |
|---|---|---|
| EP | 0877017 | 11/1998 |
| GB | 896437 A | 5/1962 |

(Continued)

OTHER PUBLICATIONS

E. P. Kohler, et al. "An Apparatus for Determining Both the Quantity of Gas Evolved and the Amount of Reagent Consumed in Reactions with Methyl Magnesium Iodide" Journal of the American Chemical Society, vol. 49, pp. 3181-3188, Dec. 1927.

(Continued)

*Primary Examiner* — John Cooney (74) *Attorney, Agent, or Firm* — Huntsman Petrochemical LLC; Lewis Craft (57) ABSTRACT

The present disclosure relates to pyrrolidine-based catalysts for use in a polyurethane formulation. The polyurethane formulation includes the pyrrolidine-based catalyst, a compound containing an isocyanate functional group, an active hydrogen-containing compound. The use of such catalysts produces high quality polyurethane foam while reducing environmental concerns that can arise during the production of polyurethane foam as well as in the foam that is produced.

13 Claims, 2 Drawing Sheets

(56) References Cited

U.S. PATENT DOCUMENTS

| | | | |
|---|---|---|---|
| RE38,415 E * | 2/2004 | Weider | C08G 18/2018 |
| | | | 521/129 |
| 6,737,471 B2 | 5/2004 | Lorenz et al. | |
| 6,790,872 B2 | 9/2004 | Kazmierski et al. | |
| 8,653,174 B2 | 2/2014 | Anderson et al. | |
| 9,309,346 B2 * | 4/2016 | Burdeniuc | C08G 18/1825 |
| 2015/0368420 A1 | 12/2015 | Schmitz et al. | |

FOREIGN PATENT DOCUMENTS

| | | |
|---|---|---|
| WO | WO2014121959 | 8/2014 |
| WO | 2016020137 A1 | 2/2016 |
| WO | WO2016020137 A | 2/2016 |

OTHER PUBLICATIONS

Herrington, R., et al. "Dow Polyurethanes Flexible Foams, Appendix D" pp. D.1-D.23 (1997).

"JEFFCAT® Amine Catalysts for the Polyurethane Industry" version JCT-0910, Huntsman Corporation, 2010.

* cited by examiner

PYRROLIDINE-BASED CATALYSTS FOR USE IN POLYURETHANE MATERIALS

CROSS-REFERENCE TO RELATED APPLICATIONS

This application is the National Phase of International Application PCT/US2015/037304 filed Jun. 24, 2015 which designated the U.S. and which claims priority to U.S. App. Ser. No. 62/018,261 filed Jun. 27, 2014. The noted applications are incorporated herein by reference.

STATEMENT REGARDING FEDERALLY SPONSORED RESEARCH OR DEVELOPMENT

Not applicable.

FIELD OF THE INVENTION

The present disclosure is directed to pyrrolidine-based catalysts for use in the production of flexible and rigid polyurethane foam and other polyurethane materials.

BACKGROUND OF THE INVENTION

Polyurethane foams are widely known and used in a variety of applications, such as in the automotive and housing industry. These foams are produced by the reaction of a polyisocyanate with a polyol in the presence of various additives. One such additive is an amine catalyst which is used to accelerate blowing (the reaction of water with polyisocyanate to generate $CO_2$) and gelling (the reaction of a polyol with polyisocyanate).

Disadvantages in using conventional amine catalysts (for example, bisdimethylaminoethylether) in polyurethane foam production include: due to their high volatility, safety and toxicity problems can occur, for example, airborne vapors emitted from such catalysts are known to cause glaucopsia, also known as blue haze or halovision, which is a temporary disturbance of vision clarity; when used in the production of foams used in automotive interior applications, fogging of automotive windshields can occur; and, conventional amine catalysts are generally known to be malodorous.

Examples of pyrrolidine catalysts which have been recently tried include N-aminoalkyl pyrrolidines (U.S. Pat. No. 5,134,217), 3- and/or 4-substituted pyrrolidines (U.S. Pat. No. 5,274,114) and aminomethylpyrrolidine ureas (EP 0877017 B1).

It is an object of the present disclosure to provide new pyrrolidine-based catalysts for use in producing rigid or flexible polyurethane foam and other polyurethane materials which exhibit high catalytic activity, reduce or eliminate glaucopsia, are odor-free and environmentally friendly.

SUMMARY OF THE INVENTION

The present disclosure provides pyrrolidine-based catalysts for use in catalyzing the formation of a polyurethane material.

According to one embodiment, there is provided a polyurethane formulation which includes a compound containing an isocyanate functional group, an active hydrogen-containing compound and the pyrrolidine-based catalyst of the present disclosure.

In another embodiment, there is provided a polyurethane material formed by reacting a compound containing an isocyanate functional group with an active hydrogen-containing group in the presence of the pyrrolidine-based catalyst.

BRIEF DESCRIPTION OF THE DRAWINGS

For a detailed understanding and better appreciation of the present invention, reference should be made to the following detailed description of the invention, taken in conjunction with the accompanying figure.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a polyol" means one polyol or more than one polyol.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

As used herein, the term "alkyl" refers to straight chain or branched chain saturated hydrocarbon groups having from 1 to 12 carbon atoms. In some embodiments, alkyl substituents may be lower alkyl substituents. The term "lower" refers to alkyl groups having from 1 to 6 carbon atoms. Examples include, but are not limited to, methyl, ethyl, n-propyl, i-propyl, butyl, and pentyl groups.

The term "alkenyl" as used herein, refers to an unsaturated straight chain or branched chain aliphatic hydrocarbon group containing at least one double bond and having 2 to 6 carbon atoms.

"Alkoxy" or "alkoxyl" refers to any of the above alkyl groups which are attached to the remainder of the molecule by an oxygen atom (RO—). Typical alkoxy groups include methoxy, ethoxy, isopropoxy, propoxy, butyloxy and the like. Further included within the meaning of alkoxy are multiple alkoxy side chains, e.g., ethoxy, methoxy ethoxy, methoxy ethoxy ethoxy and the like and substituted alkoxy side chains, e.g. dimethylamino ethoxy, diethylamino ethoxy, dimethoxy-phosphoryl methoxy and the like.

The term "alkynyl" as used herein refers to an unsaturated straight chain or branched chain aliphatic hydrocarbon group containing one triple bond and having 2 to 6 carbon atoms.

"Amino" means the group —NH$_2$.

"Aryl" refers to a monovalent, monocyclic or bicyclic aromatic hydrocarbon radical, preferably a 6 to 15 member aromatic ring system.

"Carboxyl" or "carboxy" means the monovalent group —COOH. "Carboxy lower alkoxy" means —COOR$^0$OH where R$^0$ is lower alkyl.

"Carbonyl" means the group R$^1$(C=O)R$^2$ where R$^1$ and R$^2$ can be any of a number of chemical groups, such as, but not limited to, alkyl groups.

The term "cycloalkyl" as used herein means any stable monocyclic or polycyclic system which consists of carbon atoms only, any ring of which being saturated. Examples include, but are not limited to, cyclopropyl, cyclobutyl, cyclopentyl, cyclohexyl and cycloheptyl. The term "cycloalkenyl" is intended to refer to any stable monocyclic or polycyclic system which consists of carbon atoms with at least one ring thereof being partially unsaturated.

The term "halogen" refers to fluorine, chlorine, bromine or iodine.

"Heteroaryl" means an aromatic heterocyclic ring system containing up to two rings. Examples include, but are not limited to, thienyl, furyl, indoyl, pyrrolyl, pyridinyl, pyrazinyl, oxazolyl, thiaxolyl and pyrimidinyl.

"Hetero atom" means an atom selected from N, O and S.

"Heterocycle" or "heterocyclic ring" means a substituted or unsubstituted 5 to 8 membered mono or bicyclic, non-aromatic hydrocarbon where 1 to 3 carbon atoms are replaced by a hetero atom.

"Hydroxy" or "hydroxyl" is a prefix indicating the presence of a monovalent —OH group.

The term "lower", when used in connection to describe chemical structures, as in for example, "lower alkyl" means a group having 1 to 6 carbon atoms.

"Nitro" means —NO$_2$.

"Oxo" means the group =O.

"Substituted" as in "substituted alkyl", means that the substitution can occur at one or more positions, and unless otherwise indicated, that the substituents at each substitution site are independently selected from the specified options. The term "optionally substituted" refers to the fact that one or more hydrogen atoms of a chemical group (having one or more hydrogen groups) can be, but does not have to be, substituted with another substituent.

The present disclosure is generally directed to novel polyurethane formulations which include a pyrrolidine-based catalyst, a compound containing an isocyanate functional group and an active hydrogen-containing compound, and to rigid or flexible polyurethane foam or other polyurethane material made from such formulations. The term "polyurethane" as used herein, is understood to encompass pure polyurethane, polyurethane polyurea, and pure polyurea. It has been surprisingly found that use of a pyrrolidine-based catalyst according to the present disclosure, in place of a substantial portion of, or in place of all of, conventional amine catalysts, leads to: a significant reduction in blue haze; no production of hazardous by-products dimethylformamide (DMF) or formaldehyde during use; and little to no production of dimethyl amine thus reducing hazardous emissions and mitigating foam odor problems. In some embodiments, the polyurethane foam or material that is produced using the pyrrolidine-based catalyst is substantially free of at least one of DMF, formaldehyde and dimethyl amine. By "substantially free" it is meant to say that one or more of DMF, formaldehyde or dimethyl amine is not present in the polyurethane foam or material except for trace amounts which may be present as impurities. In some embodiments, any such impurities are less than 1% by weight, while in other embodiments less than 0.5% by weight, while in still other embodiments less than 0.25% by weight and especially less than 0.1% by weight relative to the total weight of polyurethane foam or material.

In one embodiment, the pyrrolidine-based catalyst is a compound of the formula (I)

(I)

where R is selected from the group consisting of: (CH$_2$)$_n$—R$^3$, (CH$_2$)$_n$—OR$^3$, (CH$_2$)$_n$—NR$^3$COR$^4$, (CH$_2$)$_n$—NR$^3$SO$_2$R$^4$, (CH$_2$)$_n$—COOR$^3$, (CH$_2$)$_n$—COR$^3$, (CH$_2$)$_n$—SR$^3$, (CH$_2$)$_n$—SOR$^3$, (CH$_2$)$_n$—SO$_2$R$^3$, (CH$_2$)$_n$—SO$_3$H, (CH$_2$)$_n$—SONR$^3$R$^4$ and (CH$_2$)$_n$—SO$_2$NR$^3$R$^4$;

R$^3$ and R$^4$ are independently selected from:

H;

lower alkyl optionally substituted with halogen, hydroxy, lower alkoxy, N(lower alkyl)$_2$, NCO, oxo, carboxy, carboxy lower alkyl, cycloalkyl and heteroaryl;

lower cycloalkyl optionally substituted with halogen, lower alkoxy, lower alkyl, carboxy, carboxy lower alkoxy, carboxy lower alkyl, oxo, CN, NCO and NHSO$_2$-lower alkyl;

lower alkenyl optionally substituted with halogen, hydroxy, NH$_2$, NH-lower alkyl, NCO and N-(lower alkyl)$_2$;

lower alkynyl optionally substituted with halogen, hydroxy, NH$_2$, NH-lower alkyl, NCO and N-(lower alkyl)$_2$;

lower cycloalkenyl optionally substituted with halogen, lower alkoxy, lower alkyl, carboxy, carboxy lower alkoxy, oxo, NCO and CN;

aryl optionally substituted with halogen, lower alkoxy, hydroxy, lower alkyl, lower alkenyl, cycloalkyl, carboxy, carboxy lower alkoxy, carboxy lower alkyl, oxo, CN and CONR$^5$R$^6$, heteroaryl optionally substituted with halogen, lower alkoxy, lower alkyl, carbonyl, carboxy, carboxy lower alkyl, carboxy lower alkoxy, oxo and CN; and heterocycle optionally substituted with halogen, lower alkyl, lower alkoxy, carboxy, carboxy lower alkoxy, oxo, NCO, CN, SO$_2$-lower alkyl, and lower alkyl that is substituted with oxo; and n is an integer from 1 to 6.

In one particular embodiment, R is (CH$_2$)$_n$—R$^3$ or (CH$_2$)$_n$—OR$^3$ where: R$^3$ is H; lower alkyl optionally substituted with halogen, hydroxy, N(lower alkyl)$_2$, NCO, oxo, carboxy, carboxy lower alkyl, cycloalkyl and heteroaryl; or heterocycle optionally substituted with halogen, lower alkyl, lower alkoxy, carboxy, carboxy lower alkoxy, oxo, NCO, CN, SO$_2$-lower alkyl, and lower alkyl that is substituted with oxo; and n is an integer from 1 to 6. In a further embodiment, the pyrrolidine-based catalyst of the present disclosure is a compound selected from pyrrolidine propanol, 1,1'-(oxybis (ethane-2-1-diyl) dipyrrolidine, 2-pryyolidinyl-1-(2-pyrrolidinylethoxy)ethane, 2-(2-pyrrolidinylethoxy)ethan-1-ol), pyrrolidinylbutyl-morpholine, pyrrolidinylbutyl-pyrrolidine, imino-bis-4-aminobutyl pyrrolidine and a mixture thereof.

The pyrrolidine-based catalysts of formula (I) can be produced in a variety of ways. In one embodiment, 1,4 butanediol can be reacted with a primary amine (R—NH$_2$) followed by cyclization under heat. In another embodiment, the pyrrolidine-based catalyst of formula (I) can be produced by reacting pyrrolidine with a mono, di- or higher functional alcohol (R—OH) under heat. Finally, in still another embodiment, pyrrolidine can be reacted with epichlorohydrin to produce pyrrolidine propanol.

According to some embodiments, the pyrrolidine-based catalyst of formula (I) is used alone in forming the polyurethane foam or material. In still other embodiments, the pyrrolidine-based catalyst of formula (I) may be combined with an amine catalyst containing at least one tertiary amine group and/or a non-amine catalyst in forming the polyurethane foam or material. In embodiments in which the pyrrolidine-based catalyst is combined with an amine catalyst containing at least one tertiary amine group and/or a non-amine catalyst, the weight ratio of the pyrrolidine-based catalyst of formula (I) to the amine catalyst containing at least one amine group and/or the non-amine catalyst is at least 1:1, and in some embodiments, at least 1.5:1 and in still other embodiments at least 2:1 and in further embodiments at least 5:1, while in still further embodiments at least 10:1. In still other embodiments, the weight ratio of the pyrrolidine-based catalyst of formula (I) to the amine catalyst containing at least one amine group and/or the non-amine catalyst is from 0.1:99.9 to 99.9:0.1, and in still other embodiments from 1:99 to 99:1, and in still other embodiments from 5:95 to 95:5, and in further embodiments from 10:90 to 90:10, while in still further embodiments from 25:75 to 75:25.

Representative amine catalysts containing at least one tertiary group include, but are not limited to, bis-(2-dimethylaminoethyl)ether (JEFFCAT® ZF-20 catalyst), N,N,N'-trimethyl-N'-hydroxyethylbisaminoethylether (JEFFCAT® ZF-10 catalyst), N-(3-dimethylaminopropyl)-N,N-diisopropanolamine (JEFFCAT® DPA catalyst), N,N-dimethylethanolamine (JEFFCAT® DMEA catalyst), triethylene diamine (JEFFCAT® TEDA catalyst), blends of N,N-dimethylethanolamine aniethylene diamine (such as JEFFCAT® TD-20 catalyst), N,N-dimethylcyclohexylamine (JEFFCAT® DMCHA catalyst), benzyldimethylamine (JEFFCAT® BDMA catalyst), pentamethyldiethylenetriamine (JEFFCAT® PMDETA catalyst), N,N,N',N'',N''-pentamethyldipropylenetriamine (JEFFCAT® ZR-40 catalyst), N,N-bis (3-dimethylaminopropyl)-N-isopropanolamine (JEFFCAT® ZR-50 catalyst), N'-(3-(dimethylamino)propyl-N,N-dimethyl-1,3-propanediamine (JEFFCAT® Z-130 catalyst), 2-(2-dimethylaminoethoxy)ethanol (JEFFCAT® ZR-70 catalyst), N,N,N-trimethylaminoethyl-ethanolamine (JEFFCAT® Z-110 catalyst), N-ethylmorpholine (JEFFCAT® NEM catalyst), N-methylmorpholine (JEFFCAT® NMM catalyst), 4-methoxyethylmorpholine, N,N'dimethylpiperzine (JEFFCAT® DMP catalyst), 2,2'dimorpholinodiethylether (JEFFCAT® DMDEE catalyst), 1,3,5-tris(3-(dimethylamino)propyl)-hexahydro-s-triazine (JEFFCAT® TR-90 catalyst), 1-Propanamine, 3-(2-(dimethylamino) ethoxy), substituted imidazoles such as 1,2-dimethlyimidazol and 1-methyl-2-hydroxyethylimidazole, N,N'-dimethylpiperazines or bis-substituted piperazines such aminoethylpiperazine, N,N',N'-trimethyl aminoethylpiperazine or bis-(N-methyl piperazine)urea, N-methylpyrrolidines and substituted methylpyrrolidines such as 2-aminoethyl-N-methylpyrrolidine or bis-(N-methylpyrrolidine) ethyl urea, 3-dimethylaminopropylamine, N,N,N'',N''-tetramethyldipropylenetriamine, tetramethylguanidine, 1,2 bis-diisopropanol. Other examples of amine catalysts include N-alkylmorpholines such as N-methylmorpholine, N-ethylmorpholine, N-butylmorpholine and dimorpholinodiethylether, N,N'-dimethylaminoethanol, N,N-dimethylamino ethoxyethanol, bis-(dimethylaminopropyl)-amino-2-propanol, bis-(dimethylamino)-2-propanol, bis-(N,N-dimethylamino)ethylether; N,N,N'-trimethyl-N'hydroxyethyl-bis-(aminoethyl)ether, N,N-dimethyl amino ethyl-N'-methyl amino ethanol, tetramethyliminobispropylamine, reactive acid blocked catalysts such as JEFFCAT® LED and JEFFCAT® ZF brand catalysts and combinations thereof. The aforementioned JEFFCAT® catalysts are available from Huntsman Petrochemical LLC, The Woodlands, Tex.

Other amine catalysts which may be used in the present disclosure may be found in Appendix D in "Dow Polyurethanes Flexible Foams" by Herrington et al. at pages D.1-D.23 (1997), which is incorporated herein by reference. Further examples may be found in "JEFFCAT® Amine Catalysts for the Polyurethane Industry" version JCT-0910 which is incorporated herein by reference.

The non-amine catalyst is a compound (or mixture thereof) having catalytic activity for the reaction of an isocyanate group with a polyol or water, but is not a compound falling within the description of the amine catalyst above. Examples of such additional non-amine catalysts include, for example:

tertiary phosphines, such as trialkylphosphines and dialkylbenzylphosphines;

chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni;

metal carboxylates such as potassium acetate and sodium acetate;

acidic metal salts of strong acids, such as ferric chloride, stannic chloride, stannous chloride, antimony trichloride, bismuth nitrate and bismuth chloride;

strong bases, such as alkali and alkaline earth metal hydroxides, alkoxides and phenoxides;

alcoholates and phenolates of various metals, such as Ti(OR$^6$)$_4$, Sn(OR$^6$)$_4$ and Al(OR$^6$)$_3$ where R$^6$ is alkyl or aryl, and the reaction products of the alcoholates with carboxylic acids, beta-diketones and 2-(N,N-dialkylamino) alcohols;

alkaline earth metal, Bi, Pb, Sn or Al carboxylate salts; and tetravalent tin compounds, and tri- or pentavalent bismuth, antimony or arsenic compounds.

The pyrrolidine-based catalyst of formula (I) may be used in a catalytically effective amount to catalyze the reaction between a compound containing an isocyanate functional group and an active hydrogen-containing compound for making rigid or flexible polyurethane foam or other polyurethane materials. A catalytically effective amount of the pyrrolidine-based catalyst of formula (I) may range from about 0.01-15 parts per 100 parts of active hydrogen-containing compound, and in some embodiments from about 0.05-12.5 parts per 100 parts of active hydrogen-containing compound, and in even further embodiments from about 0.1-7.5 parts per 100 parts of active hydrogen-containing compound, and yet in even further embodiments from about 0.5-5 parts per 100 parts of active hydrogen-containing compound.

In one embodiment, the compound containing an isocyanate functional group is a polyisocyanate and/or an isocyanate-terminated prepolymer.

Polyisocyanates include those represented by the formula $Q(NCO)_a$ where a is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Examples of polyisocyanates include, but are not limited to, ethylene diisocyanate; 1,4-tetramethylene diisocyanate; 1,6-hexamethylene diisocyanate; 1,12-dodecane diisocyanate; cyclobutane-1,3-diiso cyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups, urethane groups, allophnate groups, isocyanurate groups, urea groups, or biruret groups; polyisocyanates obtained by telomerization reactions; polyisocyanates containing ester groups; and polyisocyanates containing polymeric fatty acid groups. Those skilled in the art will recognize that it is also possible to use mixtures of the polyisocyanates described above.

Isocyanate-terminated prepolymers may also be employed in the preparation of the polyurethane. Isocyanate-terminated prepolymers may be prepared by reacting an excess of polyisocyanate or mixture thereof with a minor amount of an active-hydrogen containing compound as determined by the well known Zerewitinoff test as described by Kohler in "Journal of the American Chemical Society," 49, 3181 (1927).

In another embodiment, the active hydrogen-containing compound is a polyol. Polyols suitable for use in the present disclosure include, but are not limited to, polyalkylene ether polyols, polyester polyols, polymer polyols, a non-flammable polyol such as a phosphorus-containing polyol or a halogen-containing polyol. Such polyols may be used alone or in suitable combination as a mixture.

Polyalkylene ether polyols include poly(alkylene oxide) polymers such as poly(ethylene oxide) and polypropylene oxide) polymers and copolymers with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols include, but are not limited to, those produced by reacting a dicarboxylic acid with an excess of a diol, for example, adipic acid with ethylene glycol or butanediol, or reaction of a lactone with an excess of a diol such as caprolactone with propylene glycol.

In addition to polyalkylene ether polyols and polyester polyols, polymer polyols are also suitable for use in the present disclosure. Polymer polyols are used in polyurethane materials to increase resistance to deformation, for example, to improve the load-bearing properties of the foam or material. Examples of polymer polyols include, but are not limited to, graft polyols or polyurea modified polyols (Polyharnstoff Dispersion polyols). Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol.

The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrin or trichlorobutylene oxide.

In addition to the pyrrolidine-based catalyst of formula (I), the compound containing an isocyanate functional group and the active hydrogen-containing compound, the polyurethane formulation may optionally include one or more auxiliary components. Examples of auxiliary components include, but are not limited to, cell stabilizers, surfactants, chain extenders, pigments, fillers, flame retardants, thermally expandable microspheres, blowing agents, water, thickening agents, smoke suppressants, reinforcements, antioxidants, UV stabilizers, antistatic agents, infrared radiation absorbers, dyes, mold release agents, antifungal agents, biocides or any combination thereof.

Cell stabilizers may include, for example, silicon surfactants or anionic surfactants. Examples of suitable silicon surfactants include, but are not limited to, polyalkylsiloxane, polyoxyalkylene polyol-modified dimethylpolysiloxane, alkylene glycol-modified dimethylpolysiloxane, or any combination thereof.

Suitable surfactants (or surface-active agents) include emulsifiers and foam stabilizers, such as silicone surfactants known in the art, for example, polysiloxanes, as well as various amine salts of fatty acids, such as diethylamine oleate or diethanolamine stearate, as well as sodium salts of ricinoleic acids.

Examples of chain extenders include, but are not limited to, compounds having hydroxyl or amino functional groups, such as glycols, amines, diols, and water. Further non-limiting examples of chain extenders include ethylene glycol, propylene glycol, 1,4-butanediol, 1,3-butanediol, 1,5-pentanediol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclo-hexanol, 1,2-diaminoethane, or any mixture thereof.

Pigments may be used to color code the polyurethane materials during manufacture, to identify product grade, or to conceal yellowing. Pigments may include any suitable organic or inorganic pigments. For example, organic pigments or colorants include, but are not limited to, azo/diazo dyes, phthalocyanines, dioxazines, or carbon black. Examples of inorganic pigments include, but are not limited to, titanium dioxide, iron oxides, or chromium oxide.

Fillers may be used to increase the density and load bearing properties of polyurethane foam or material. Suitable fillers include, but are not limited to, barium sulfate, carbon black or calcium carbonate.

Flame retardants can be used to reduce flammability. For example, such flame retardants include, but are not limited to, chlorinated phosphate esters, chlorinated paraffins, or melamine powders.

Thermally expandable microspheres include those containing a (cyclo)aliphatic hydrocarbon. Such microspheres are generally dry, unexpanded or partially unexpanded microspheres consisting of small spherical particles with an average diameter of typically 10 to 15 micron. The sphere is formed of a gas proof polymeric shell (consisting e.g. of acrylonitrile or PVDC), encapsulating a minute drop of a (cyclo)aliphatic hydrocarbon, e.g. liquid isobutane. When these microspheres are subjected to heat at an elevated temperature level (e.g. 150° C. to 200° C.) sufficient to soften the thermoplastic shell and to volatilize the (cyclo)aliphatic hydrocarbon encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. Examples of such microspheres are the EXPANCEL®-DU microspheres which are marketed by AKZO Nobel Industries of Sweden.

A blowing agent may also be added to the polyurethane formulation, which may either be an exothermic or endothermic blowing agent or a combination of both.

Any known blowing agent used in the preparation of foam may be used in the present disclosure as a blowing agent. Examples of chemical blowing agents include gaseous compounds such as nitrogen or carbon dioxide, gas (e.g. $CO_2$) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures. Examples of physical blowing agents include volatile liquids such as chlorofluorocarbons, partially halogenated hydrocarbons or non-halogenated hydrocarbons like propane, n-butane, isobutane, n-pentane, isopentane and/or neopentane.

The thickening agent may be a cellulose ether, for example, methyl cellulose ether and ethyl cellulose ether, hydroxyethyl cellulose ether, hydroxypropyl cellulose ether, carboxymethyl cellulose ether, hydroxyethyl methyl cellulose ether, hydroxypropyl methyl cellulose ether, and hydroxyethyl ethyl cellulose ether. Water soluble salts of these cellulose ethers, such as sodium carboxymethylcellulose or sodium hydroxyethylcellulose, may also be used. Also included are starches, for example, potato starch or waxy corn starch; organic clays, carrageenan, cassia gum, diutan gum, gellan gum, alginic acid, phycocolloids, agar, gum arabic, guar gum, locust bean gum, gum karaya, whelun gum, xanthan gum, tragacanth, prolamine derived from corn (i.e. Zein), collagen (i.e. derivatives extracted from animal connective tissue such as gelatin and glue), and casein (i.e. derived from cow's milk); polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid and latex (which is a broad category that includes a variety of polymerizable substances formed in a water emulsion; an example is styrene-butadiene copolymer).

The methods for producing a polyurethane material from a polyurethane formulation according to the present disclosure are well known to those skilled in the art and can be found in, for example, U.S. Pat. Nos. 5,420,170, 5,648,447, 6,107,359, 6,552,100, 6,737,471 and 6,790,872, the contents of which are hereby incorporated by reference. Various types of polyurethane materials can be made such as rigid foams, flexible foams, semi-flexible foams, microcellular elastomers, backings for textiles, spray elastomers, cast elastomers, polyurethane-isocyanurate foams, reaction injection molded polymers, structural reaction injection molded polymers and the like.

For example, a general flexible polyurethane foam formulation having a 15-150 $kg/m^3$ density (e.g. automotive seating) containing the pyrrolidine-based catalyst of formula (I) may comprise the following components in parts by weight (pbw):

| Flexible Foam Formulation | pbw |
|---|---|
| Polyol | 20-100 |
| Surfactant | 0.3-3 |
| Blowing Agent | 1-6 |
| Crosslinker | 0-3 |
| Pyrrolidine-based catalyst | 0.2-2.5 |
| Isocyanate Index | 70-115 |

Also, a general rigid polyurethane foam formulation having a 15-70 $kg/m^3$ density containing the pyrrolidine-based catalyst of formula (I) may comprise the following components in parts by weight (pbw):

| Rigid Foam Formulation | pbw |
|---|---|
| Polyol | 100 |
| Surfactant | 1-3 |
| Blowing Agent | 20-40 |
| Water | 0-3 |
| Pyrrolidine-based catalyst | 0.5-3 |
| Isocyanate Index | 80-400 |

The amount of compound containing an isocyanate functional group is not limited, but will generally be within those ranges known to one skilled in the art. An exemplary range given above is indicated by reference to Isocyanate Index which is defined as the number of equivalents of isocyanate divided by the total number of equivalents of active hydrogen, multiplied by 100.

Thus, in yet another embodiment, the present disclosure provides a method for producing a polyurethane material which comprises contacting a compound containing an isocyanate functional group, an active hydrogen-containing compound and optional auxiliary components in the presence of the pyrrolidine-based catalyst according to the present disclosure.

In one particular embodiment, the polyurethane material is a rigid or flexible foam prepared by bringing together at least one polyol and at least one polyisocyanate in the presence of the pyrrolidine-based catalyst of formula (I) to form a reaction mixture and subjecting the reaction mixture to conditions sufficient to cause the polyol to react with the polyisocyanate. The polyol, polyisocyanate and pyrrolidine-based catalyst may be heated prior to mixing them and forming the reaction mixture. In other embodiments, the polyol, polyisocyanate and pyrrolidine-based catalyst are mixed at ambient temperature (for e.g. from about 15°-40° C.) and heat may be applied to the reaction mixture, but in some embodiments, applying heat may not be necessary. The polyurethane foam may be made in a free rise (slabstock) process in which the foam is free to rise under minimal or no vertical constraints. Alternatively, molded foam may be made by introducing the reaction mixture in a closed mold and allowing it to foam within the mold. The particular polyol and polyisocyanate are selected with the desired characteristics of the resulting foam. Other auxiliary components useful in making polyurethane foams, such as those described above, may also be included to produce a particular type of foam.

According to another embodiment, a polyurethane material may be produced in a one-step process in which an A-side reactant is reacted with a B-side reactant. The A-side reactant may comprise a polyisocyanate while the B-side reactant may comprise a polyol and the pyrrolidine-based catalyst according to the present disclosure. In some embodiments, the A-side and/or B-side may also optionally contain other auxiliary components such as those described above.

The polyurethane materials produced may be used in a variety of applications, such as, a precoat; a backing material for carpet; building composites; insulation; spray foam insulation; applications requiring use of impingement mix spray guns; urethane/urea hybrid elastomers; vehicle interior and exterior parts such as bed liners, dashboards, door panels, and steering wheels; flexible foams (such as furniture foams and vehicle component foams); integral skin foams; rigid spray foams; rigid pour-in-place foams; coatings; adhesives; sealants; filament winding; and other polyurethane composite, foams, elastomers, resins, and reaction injection molding (RIM) applications.

EXAMPLES

Example 1

Figure 1:
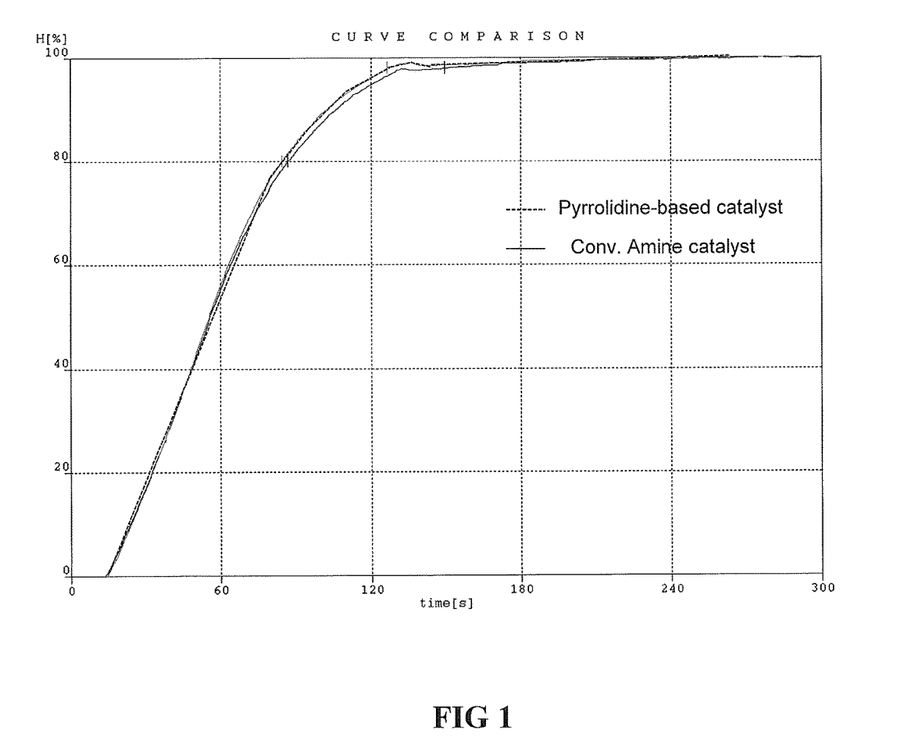
FIG. 1 is a graph depicting the blowing catalytic activity for a pyrrolidine-based catalyst according to the present disclosure and an amine catalyst.

The catalytic activity (both the blowing and gelling reactions) of a pyrrolidine-based catalyst according to the present disclosure (2-pyrrolidinyl-1-(2-pyrrolidinylethoxy)ethane) was evaluated in a flexible polyurethane foam and compared to a flexible foam produced using a conventional amine catalyst, N,N,N'-trimethyl-N'-hydroxyethylbisaminoethylether, a well-known, highly effective blowing catalyst. The blowing reactivity of the catalysts was determined by using the Foamat rate of rise reactivity instrument. The reactivity comparison is shown in FIG. 1 and depicts foam height as a function of time. The amount of catalyst used in the polyurethane formulation was adjusted so that the profiles of each of the curves were nearly identical, which indicates identical foam reactivity. The required amount of each catalyst necessary to obtain these curves was then compared. The amount of the pyrrolidine-based catalyst according to the present disclosure that was needed to obtain the curve was 0.13 parts per hundred parts of polyol, while the amount of conventional amine catalyst that was needed was 0.15 parts per hundred parts of polyol. Surprisingly, the pyrrolidine-based catalyst of the present disclosure exhibited slightly better blowing efficacy when compared to the highly effective blowing catalyst N,N,N'-trimethyl-N'-hydroxyethylbisaminoethylether thus demonstrating that the pyrrolidine-based catalysts of the present disclosure are highly effective for promoting the blowing reaction in flexible polyurethane foams.

Figure 2:
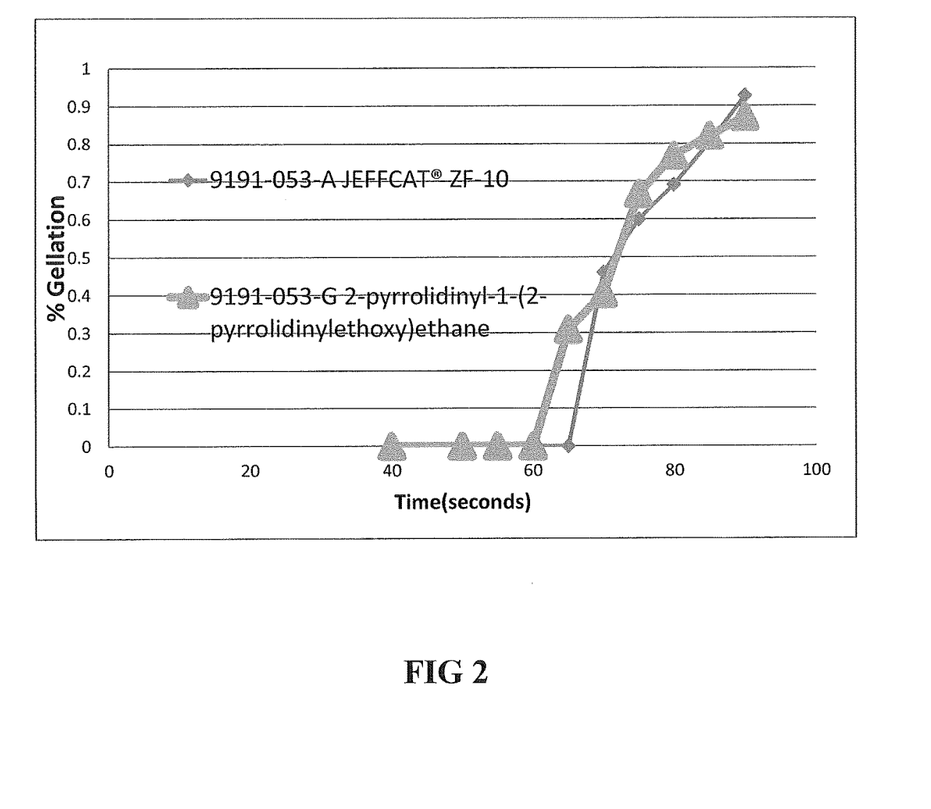
FIG. 2 is a graph depicting the gelling catalytic activity for a pyrrolidine-based catalyst according to the present disclosure and an amine catalyst.

Most conventional amine catalysts also catalyze the polyurethane gelling reaction to differing degrees. The gelling reaction for each of the catalysts above was measured using the BB drop test, where BB foam penetration is measured as a function of time and BB drop depth is inversely proportional to foam gelation. Both catalysts were compared at the same usage amounts and the results are shown in FIG. 2. The results indicate that the pyrrolidine-based catalyst according to the present disclosure has slightly better gelling efficiency than the conventional amine catalyst.

Example 2

A further example for comparing the catalytic activity is to study the gel/blow ratio. This can be done by reacting polyols, water, catalyst and an isocyanate in a solvent. The reaction can be quenched at various times and analyzed for the reaction products that are produced, such as urethane or urea, by LC or LC/MS methods. The rate of reaction can then be calculated from the reaction product increase over time or at a specific time. This can then be compared against a formulation that does not contain water for the blowing reaction to determine the relative selectivity for the reactions at a constant gel time.

The following all urethane formulations (i.e. did not contain water for the blowing reaction) were first prepared:

TABLE 1

All Urethane Formulations

|  | A (pbw) | B (pbw) | C (pbw) | D (pbw) | E (pbw) |
|---|---|---|---|---|---|
| Polyol[1] | 33.5 | 33.5 | 33.5 | 33.5 | 33.5 |
| Surfactant[2] | 0.5 | 0.5 | 0.5 | 0.5 | 0.5 |
| Fire Retardant[3] | 4.2 | 4.2 | 4.2 | 4.2 | 4.2 |
| Blowing Agent[4] | 12.7 | 12.7 | 12.7 | 12.7 | 12.7 |
| Triethylenediamine[5] | 1.0 | | | | |
| Bis-(2-dimethylaminoethyl)ether[6] | | 1.6 | | | |
| Pyrrolidine-based catalyst[7a] | | | 1.6 | | |
| Pyrrolidine-based catalyst[7b] | | | | 1.6 | |
| Pyrrolidine-based catalyst[8] | | | | | 4.2 |

[1]JEFFOL® SG-522 sucrose glycerin polyol.
[2]Dabco® DC-193 silicone surfactant.
[3]Fyrol® PCF fire retardant.
[4]HCFC 141 B hydrofluorocarbon.
[5]JEFFCAT® TD-33A triethylenediamine catalyst.
[6]JEFFCAT® ZF-22 bis-(2-dimethylaminoethyl)ether in dipropylene glycol catalyst.
[7a]2-pyrrolidinyl-1-(2-pyrrolidinylethoxy)ethane from batch 1.
[7b]2-pyrrolidinyl-1-(2-pyrrolidinylethoxy)ethane from batch 2.
[8]Bispyrrolidino-2-propanol.

The ingredients above, except for the catalyst, were placed in a container and mixed for about 2 hours on a bottle roller. Air and foam were allowed to settle and the catalyst (in an amount needed to approximately achieve a 90 second string gel time) was added and the mixture was mixed at 3000 rpm for about 10 minutes. About 49 parts of Rubinate® polymeric MDI was then added and the mixture was mixed for 10 seconds at 3000 rpm. The cream time, top of cup and tack free times were then determined and the results are provided below:

|  | A | B | C | D | E |
|---|---|---|---|---|---|
| Cream Time (sec) | 32 | 18.6 | 16.6 | 18.9 | 22.7 |
| Top of cup (sec) | 77 | 74 | 79 | 79 | 61 |

-continued

|  | A | B | C | D | E |
|---|---|---|---|---|---|
| String gel (sec) | 85 | 89 | 90 | 90 | 86 |
| Tack free (sec) | 106 | 116 | 120 | 112 | 138 |

The following all water formulations (i.e. contained water for the blowing reaction) were then prepared:

TABLE 2

All Water Formulations

|  | A' (pbw) | B' (pbw) | C' (pbw) | D' (pbw) | E' (pbw) |
|---|---|---|---|---|---|
| Polyol[1] | 26.4 | 26.4 | 26.4 | 26.4 | 26.4 |
| Surfactant[2] | 0.5 | 0.5 | 0.5 | 0.5 | 0.5 |
| Fire Retardant[3] | 3.7 | 3.7 | 3.7 | 3.7 | 3.7 |
| Propylene Carbonate | 5.8 | 5.8 | 5.8 | 5.8 | 5.8 |
| Blowing Agent[4] | 12.7 | 12.7 | 12.7 | 12.7 | 12.7 |
| Triethylenediamine[5] | 0.8 |  |  |  |  |
| Bis-(2-dimethylaminoethyl)ether[6] |  | 0.3 |  |  |  |
| Pyrrolidine-based catalyst[7a] |  |  | 0.29 |  |  |
| Pyrrolidine-based catalyst[7b] |  |  |  | 0.3 |  |
| Pyrrolidine-based catalyst[8] |  |  |  |  | 1.3 |

[1]JEFFOL ® SG-522 sucrose glycerin polyol.
[2]Dabco ® DC-193 silicone surfactant.
[3]Fyrol ® PCF fire retardant.
[4]Water.
[5]JEFFCAT ® TD-33A triethylenediamine catalyst.
[6]JEFFCAT ® ZF-22 bis-(2-dimethylaminoethyl)ether in dipropylene glycol catalyst.
[7a]2-pyrrolidinyl-1-(2-pyrrolidinylethoxy)ethane from batch 1.
[7b]2-pyrrolidinyl-1-(2-pyrrolidinylethoxy)ethane from batch 2.
[8]Bispyrrolidino-2-propanol.

The ingredients above, except for the catalyst, were placed in a container and mixed for about 2 hours on a bottle roller. Air and foam were allowed to settle and the catalyst (in an amount needed to approximately achieve a 90 second string gel time) was then added and the mixture was mixed at 3000 rpm for about 10 minutes. About 62 parts of Rubinate® polymeric MDI was then added and the mixture was mixed for 10 seconds at 3000 rpm. The cream time, top of cup and tack free times were then determined and the results are provided in table below:

|  | A' | B' | C' | D' | E' |
|---|---|---|---|---|---|
| Cream Time (sec) | 23.5 | 10 | 10.3 | 12.3 | 16.1 |
| Top of Cup (sec) | 72 | 29 | 42.1 | 46.7 | 56.7 |
| String Gel (sec) | 87 | 84 | 85 | 88 | 90 |
| Tack Free (sec) | 112 | 194 | 181 | 200 | 179 |

Using the amount of catalyst as described above in Tables 1 and 2, it is possible to assign a value for selectivity by comparing such amounts for each of the formulations as follows:

| Catalyst | All Urethane Formulation (pbw) | All Water Formulation (pbw) | Gel/Blow Ratio |
|---|---|---|---|
| Triethylenediamine | 1.0 | 0.8 | 1.25 |
| Bis-(2-dimethylaminoethyl)ether in dipropylene glycol | 1.6 | 0.28 | 5.52 |
| 2-pyrrolidinyl-1-(2-pyrrolidinylethoxy)ethane | 1.6 | 0.29 | 5.52 |
| 2-pyrrolidinyl-1-(2-pyrrolidinylethoxy)ethane | 1.6 | 0.3 | 5.33 |
| Bispyrrolidino-2-propanol | 4.2 | 1.3 | 3.23 |

It was surprising that the 2-pyrrolidinyl-1-(2-pyrrolidinylethoxy)ethane catalyst and bispyrrolidino-2-propanol catalyst were more selective and active than the triethylenediamine catalyst and were almost as selective and active as the bis-(2-dimethylaminoethyl)ether catalyst which is one of the strongest conventional water blowing tertiary catalysts in current use. This was surprising since it was expected that increased steric hindrance in the pyrrolidine-based catalysts would result in much weaker catalysts. For example, it is known that diethylcyclohexylamine is a much weaker catalyst than dimethylcyclohexylamine. The relative reactivity for diethylcyclohexylamine in butanol with phenyl isocyanate is 0.70 while for dimethylcyclohexylamine the relative reactivity is 6.0. This increase in relative reactivity is due to the lower amount of steric hindrance. The relative reactivity's for the pyrrolidine-based catalysts are surprisingly strong, especially for the 2-pyrrolidinyl-1-(2-pyrrolidinylethoxy)ethane catalyst which has a high amount of steric hindrance.

Example 3

As described above, blue haze or corneal edema and malodorous foam can be caused by vapors of highly volatile tertiary amine catalysts. The following formulations were prepared and allowed to react to produce foam to determine if the pyrrolidine-based catalysts could eliminate these known problems:

TABLE 3

Low Density Open Cell Polyurethane Foam Formulations

|  | A (pbw) | B (pbw) | C (pbw) |
|---|---|---|---|
| Polyol[1] | 19 | 19 | 19 |
| Polyol[2] | 14 | 14 | 14 |
| Emulsifier[3] | 15.1 | 15.1 | 15.1 |
| Surfactant[4] | 0.9 | 0.9 | 0.9 |
| Blowing Agent[5] | 20 | 20 | 20 |
| Fire Retardant Blend | 25 | 25 | 25 |
| Bis-(2-dimethylaminoethyl)ether | 4 |  |  |
| N,N,N'-trimethylaminoethylethnaolamine | 2 | 2 | 2 |
| Pyrrolidine-based catalyst[6] |  | 4 |  |
| Pyrrolidine-based catalyst[7] |  |  | 4 |

[1]JEFFOL ® 31-35 glycerin based polyol.
[2]JEFFOL ® SD-441 sucrose/DEG polyol.
[3]SURFONIC ® N-95 nonylphenol ethoxylate.
[4]Silstab ® 2760 silicone surfactant.
[5]Water.
[6]2-pyrrolidinyl-1-(2-pyrrolidinylethoxy)ethane.
[7]Bispyrrolidino-2-propanol.

The ingredients above were mixed together, 47.5 parts of the mixture was then reacted with 52.5 parts of RUBINATE® polymeric MDI (1:1 by volume), and the cream time, top of cup, string gel and tack free times were determined:

|  | A | B | C |
| --- | --- | --- | --- |
| Cream Time (sec) | 4.4 | 4.8 | 6.8 |
| Top of Cup (sec) | 6.4 | 7.2 | 10.9 |
| String Gel (sec) | 10.1 | 12.8 | 16.9 |
| Tack Free (sec) | 11.6 | 16.3 | 19.7 |

The pyrrolidine-based catalysts made low density foams having equal quality as the foam produced by the conventional amine catalysts, with no odor or blue haze detected.

Example 4

Pour in place foam formulations were prepared as shown in Table 4:

TABLE 4

Pour in Place Foam Formulation

|  | A (pbw) | B (pbw) |
| --- | --- | --- |
| Polyol[1] | 48.6 | 48.6 |
| Polyol[2] | 20.8 | 20.8 |
| Trichloropropylphosphate | 14.8 | 14.8 |
| Solvent[3] | 2.1 | 2.1 |
| Surfactant[4] | 0.5 | 0.5 |
| Blowing Agent[5] | 1.7 | 1.7 |
| Blowing Agent[6] | 7 | 7 |
| 1,2-dimethylimidazole 50% in DPG | 3.1 | 3.1 |
| Tertiary Amine Catalyst[7] | 0.41 | 0.41 |
| Tertiary Amine Catalyst[8] | 1.37 |  |
| Pyrrolidine-based Catalyst[9] |  | 0.96 |

[1]TEROL ® 250 aromatic polyester polyol.
[2]JEFFOL ® R-470-X aromatic amino polyol.
[3]JEFFSOL ® DB diethyleneglycol butyl ether.
[4]Dabco ® DC-193 silicone surfactant.
[5]Water.
[6]Soltice ® LBA 1,1,1-trifluoro-3-chloro-2-propene blowing agent.
[7]JEFFCAT ® LED-103acid blocked catalyst
[8]JEFFCAT ® ZF-54 acid blocked catalyst.
[9]2-pyrrolidinyl-1-(2-pyrrolidinylethoxy)ethane catalyst The ingredients above were mixed together, 49 parts of the mixture was then reacted with 51 parts of Rubinate® polymeric MDI (1:1 by volume), and the cream time, top of cup, string gel and tack free times were determined:

|  | A | B |
| --- | --- | --- |
| Cream Time (sec) | 7.8 | 8 |
| Top of Cup (sec) | 22.4 | 23.9 |
| String Gel (sec) | 42 | 46.5 |
| Tack Free (sec) | 59 | 62 |

The acid blocked catalysts are known to provide better stability than most conventional tertiary amine catalysts when combined with the 1,1,1-trifluoro-3-chloro-2-propene blowing agent (which is highly desirable blowing agent due to its low global warming potential). It was surprisingly found that the 1,1,1-trifluoro-3-chloro-2-propene blowing agent was also stable when it was combined with the pyrrolidine-based catalyst, and such combination produced a foam of equal quality when compared to foam produced using just the acid blocked catalysts combined with the 1,1,1-trifluoro-3-chloro-2-propene blowing agent.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A polyurethane formulation comprising:
   (i) a pyrrolidine-based catalyst selected from pyrrolidine propanol, 1,1'-(oxybis(ethane-2-1-diyl) dipyrrolidine, 2-pyrrolidinyl-1-(2-pyrrolidinylethoxy)ethane, 2-(2-pyrrolidinylethoxy)ethan-1-ol), pyrrolidinylbutyl-morpholine, pyrrolidinylbutyl-pyrrolidine, imino-bis-4-aminobutyl pyrrolidine, 1,3-dipyrrolidinopropan-2-ol, and a mixture thereof;
   (ii) a compound containing an isocyanate functional group; and
   (iii) an active hydrogen-containing compound.

2. The polyurethane formulation of claim 1 wherein the compound containing an isocyanate functional group is at least one of a polyisocyanate and an isocyanate-terminated prepolymer.

3. The polyurethane formulation of claim 1 wherein the active hydrogen-containing compound is a polyol.

4. The polyurethane formulation of claim 3 wherein the polyol is a polyalkylene ether polyol, polyester polyols, polymer polyols, a non-flammable polyol, a halogen-containing polyol or a mixture thereof.

5. The polyurethane formulation of claim 1 further comprising at least one additional catalyst selected from an amine catalyst containing at least one tertiary amine group, a non-amine catalyst, and a combination thereof.

6. The polyurethane formulation of claim 5, wherein the amine catalyst is selected from bis-(2-dimethylaminoethyl) ether, N,N,N'-trimethyl-N'-hydroxyethylbisaminoethylether, N-(3-dimethylaminopropyl)-N, N-diisopropanolamine, N, N-dimethylethanolamine, triethylene diamine, a blend of N,N-dimethylethanolamine and triethylene diamine, N,N-dimethylcyclohexylamine, benzyldimethylamine, pentamethyldiethylenetriamine, N,N,N',N'',N''-pentamethyldipropylenetriamine, N,N-bis(3-dimethylaminopropyl)-N-isopropanolamine, N'-(3-(dimethylamino)propyl-N,N-dimethyl-1,3-propanediamine, 2-(2-dimethylaminoethoxy) ethanol, N,N,N'-trimethylaminoethyl-ethanolamine, N-ethylmorpholine, N-methylmorpholine, 4-methoxyethyl-morpholine, N, N'dimethylpiperzine, 2,2'dimorpholinodiethylether, 1,3,5-tris(3-(dimethylamino)propyl)-hexahydro-s-triazine, 1-Propanamine, 3-(2-(dimethylamino)ethoxy), a substituted imidazole, N,N'-dimethylpiperazine, aminoethylpiperazine, N,N',N'-trimethyl aminoethylpiperazine, bis-(N-methyl piperazine)urea, N-methylpyrrolidine, 2-aminoethyl-N-methylpyrrolidine, bis-(N-methylpyrrolidine)ethyl urea, 3-dimethylaminopropylamine, N,N,N'',N''-tetramethyldipropylenetriamine, tetramethylguanidine, 1,2 bis-diisopropanol, N-methylmorpholine, N-ethylmorpholine, N-butylmorpholine, dimorpholinodiethylether, N,N'-dimethylaminoethanol, N, N-dimethylamino ethoxyethanol, bis-(dimethylaminopropyl)-amino-2-propanol, bis-(dimethylamino)-2-propanol, bis-(N,N-dimethylamino)ethylether; N,N,N'-trimethyl-N'hydroxyethyl-bis-(aminoethyl)ether, N,N-dimethylaminoethyl-N'-methyl amino ethanol, tetramethyliminobispropylamine, a reactive acid blocked catalyst and a mixture thereof.

7. The polyurethane formulation of claim 5 wherein the weight ratio of the pyrrolidine-based catalyst of formula (I) to the at least one additional catalyst is at least 1:1.

8. The polyurethane formulation of claim 1 further comprising one or more auxiliary components selected from a cell stabilizer, surfactant, chain extender, pigment, filler, flame retardant, thermally expandable microsphere, blowing agent, water, thickening agent, smoke suppressant, reinforcement, antioxidant, UV stabilizer, antistatic agent, infrared radiation absorber, dye, mold release agent, antifungal agent, biocides and a combination thereof.

9. A method for producing a polyurethane material comprising contacting a compound containing an isocyanate functional group, an active hydrogen-containing compound and optional auxiliary components in the presence of a pyrrolidine-based catalyst selected from pyrrolidine propanol, 1,1'-(oxybis(ethane-2-1-diyl) dipyrrolidine, 2-pyrrolidinyl-1-(2-pyrrolidinylethoxy)ethane, 2-(2-pyrrolidinylethoxy)ethan-1l-ol), pyrrolidinylbutyl-morpholine, pyrrolidinylbutyl-pyrrolidine, imino-bis-4-aminobutyl pyrrolidine, 1,3-dipyrrolidinopropan-2-ol, and a mixture thereof.

10. A polyurethane material produced according to the method of claim 9.

11. The polyurethane material of claim 10, wherein the polyurethane material is a rigid foam or a flexible foam.

12. The polyurethane material of claim 10, wherein the polyurethane material is substantially free of at least one of DMF, formaldehyde and dimethyl amine.

13. The polyurethane material produced according to the method of claim 9 for use as a precoat, a backing material for carpet, a building composite, insulation, a spray foam insulation, a urethane/urea hybrid elastomers; in vehicle interior and exterior parts, a flexible foam, an integral skin foam, a rigid spray foam, a rigid pour-in-place foam; a coating; an adhesive, a sealant, or a filament winding.

* * * * *